O. LINDEMANN.
Improvement in Mats for Bird Cages.
No. 122,472. Patented Jan. 2, 1872.
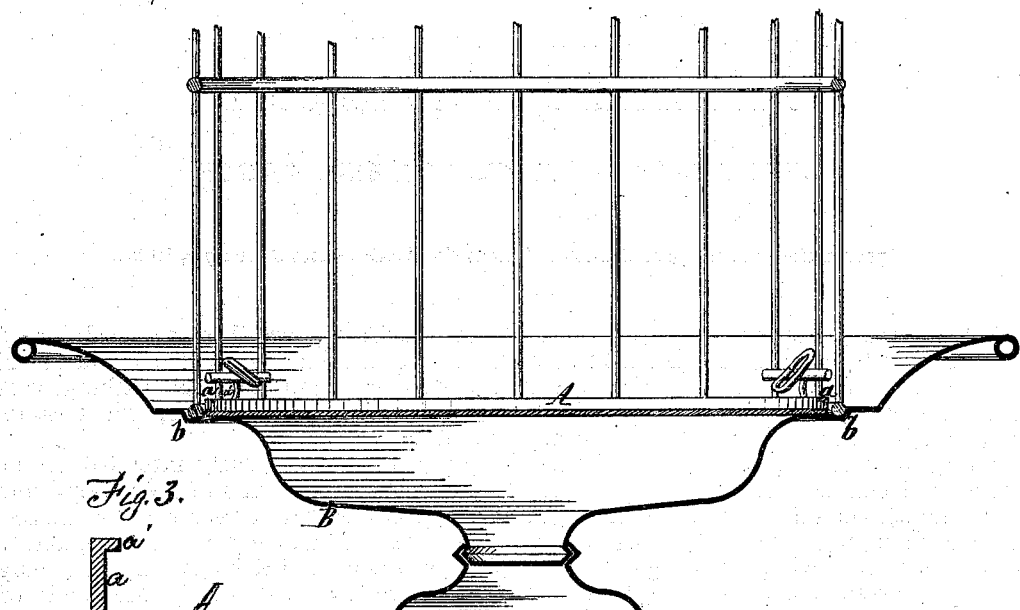
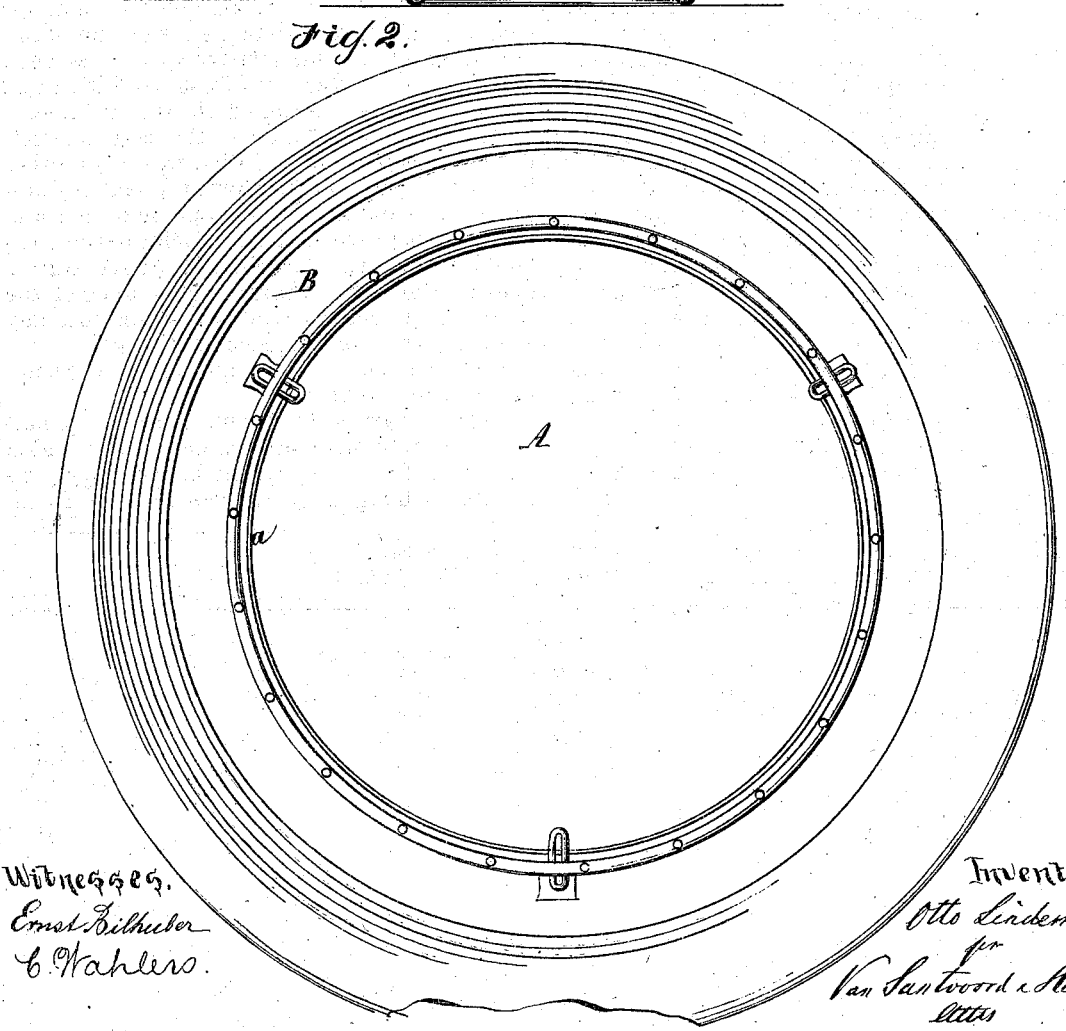

122,472

UNITED STATES PATENT OFFICE.

OTTO LINDEMANN, OF NEW YORK, N. Y.

IMPROVEMENT IN MATS FOR BIRD-CAGES.

Specification forming part of Letters Patent No. 122,472, dated January 2, 1872.

*To all whom it may concern:*

Be it known that I, OTTO LINDEMANN, of the city, county, and State of New York, have invented a new and Improved Mat for Bird-Cages; and I do hereby declare the following to be a full, clear, and exact description thereof, which will enable those skilled in the art to make and use the same, reference being had to the accompanying drawing forming part of this specification, in which drawing—

Figure 1 represents a vertical section of my invention. Figure 2 is a plan or top view of the same. Fig. 3 is a central section of the same.

Similar letters indicate corresponding parts.

This invention consists in a mat for bird-cages, stamped up or spun with a raised flange and an inwardly-projecting flange or rim, and made to fit the bottom of the cage in such a manner that by the mat the bottom of the cage is protected from dirt or impurities, and at the same time by the raised flange my mat is rendered capable of retaining sand, which is requisite for the health of the bird, thereby producing an article which is cheap and durable, and which can be conveniently removed from the cage for the purpose of cleaning, and which at the same time does not interfere with the appearance of the cage.

In the drawing, the letter A designates my mat, which is struck up or spun of sheet metal in the proper form to fit the bottom of a bird-cage, as shown. Said mat is provided with a raised flange, $a$, and inwardly-projecting flange or rim $a'$, so that the same is rendered capable of containing a quantity of sand, which is requisite for the health of the bird; and furthermore this flange prevents the water which the bird may spill from the bathing or feed cups from running down on the bottom or stand B.

My mat is particularly intended for bird-cages with raised stands, as shown, said stands being provided with a recess, $b$, for the reception of the bottom ring of the cage, and also for the reception of the mat, said mat being of such a size that it fits nicely into the interior of the cage, as shown.

When it is desired to remove the mat for cleaning the cage is detached from the stand B and lifted off, and after the mat has been cleaned and refilled with fresh sand it can be replaced within the cage with little trouble.

By my mat the bottom of the cage is effectually protected against dirt, water, or other impurities; and furthermore, the mat is durable and cheap, and, being capable of containing sand, it proves to be beneficial to the bird; and my mat, when applied as above stated, does not interfere with the appearance of the cage, and it can be readily inserted into any cage of corresponding size and shape.

What I claim as new, and desire to secure by Letters Patent, is—

As a new article of manufacture, a cage-mat struck up or spun of sheet metal, and provided with a raised flange, $a$, and inwardly-projecting rim or flange $a'$, as shown and described.

OTTO LINDEMANN.

Witnesses:
W. HAUFF,
E. F. KASTENHUBER.   (170)